(12) United States Patent
Muramatsu et al.

(10) Patent No.: US 10,981,493 B2
(45) Date of Patent: Apr. 20, 2021

(54) CONTROL APPARATUS FOR VEHICLE HEADLIGHT, CONTROL METHOD FOR VEHICLE HEADLIGHT, VEHICLE HEADLIGHT SYSTEM

(71) Applicants: Stanley Electric Co., Ltd., Tokyo (JP); Honda Motor Co., Ltd., Tokyo (JP)

(72) Inventors: Naoki Muramatsu, Tokyo (JP); Ryuichi Nakano, Saitama (JP)

(73) Assignees: STANLEY ELECTRIC CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/810,316

(22) Filed: Mar. 5, 2020

(65) Prior Publication Data

US 2020/0282897 A1    Sep. 10, 2020

(30) Foreign Application Priority Data

Mar. 6, 2019    (JP) .............................. JP2019-040195

(51) Int. Cl.
*B60Q 1/14*    (2006.01)
*B60Q 1/00*    (2006.01)

(52) U.S. Cl.
CPC ........... *B60Q 1/143* (2013.01); *B60Q 1/0023* (2013.01); *B60Q 2300/45* (2013.01)

(58) Field of Classification Search
CPC . B60Q 1/08; B60Q 1/14; B60Q 1/143; B60Q 1/0023; H05B 47/11
See application file for complete search history.

(56) References Cited

U.S. PATENT DOCUMENTS

| | | | | |
|---|---|---|---|---|
| 1,954,806 A * | 4/1934 | Falge | ...................... | F21S 41/00 362/212 |
| 5,193,894 A * | 3/1993 | Lietar | ...................... | B60Q 1/10 362/276 |
| 5,638,116 A * | 6/1997 | Shimoura | ............ | G05D 1/0246 348/118 |
| 5,850,254 A * | 12/1998 | Takano | ...................... | B60R 1/00 348/148 |
| 7,744,261 B2 * | 6/2010 | Fukawa | ................ | F21S 41/143 362/543 |
| 8,858,050 B2 * | 10/2014 | Yamamoto | ............... | B60Q 1/14 362/544 |

(Continued)

FOREIGN PATENT DOCUMENTS

JP    5394901 B2    1/2014

*Primary Examiner* — Amy Cohen Johnson
*Assistant Examiner* — Syed M Kaiser
(74) *Attorney, Agent, or Firm* — Kenealy Vaidya LLP (57) ABSTRACT

To achieve both reduction of a sense of discomfort to a driver due to a reflective object and improvement in visibility of a pedestrian or the like. A control apparatus for controlling light irradiated by a headlight of a vehicle, where the control apparatus causes the headlight to form a first irradiation light and a second irradiation light that overlaps a certain range on the lower end side in the vertical direction of the first irradiation light and overlaps the entire range in the width direction of the first irradiation light, and causes to dim at least a part of the entire range of the first irradiation light corresponding to the position of a reflective object when the reflective object fixed on the road ahead of the vehicle is present.

11 Claims, 8 Drawing Sheets

(56) References Cited

U.S. PATENT DOCUMENTS

| | | | | |
|---|---|---|---|---|
| 9,013,058 B2* | 4/2015 | Watanabe | B60Q 1/085 307/10.8 |
| 10,703,256 B2* | 7/2020 | Ridler | B60Q 1/085 |
| 2004/0143380 A1* | 7/2004 | Stam | B60Q 1/085 701/36 |
| 2005/0036660 A1* | 2/2005 | Otsuka | B60Q 1/1423 382/104 |
| 2005/0134483 A1* | 6/2005 | Monji | B60Q 1/085 340/933 |
| 2006/0146552 A1* | 7/2006 | Shaffer | B60Q 1/085 362/465 |
| 2006/0238704 A1* | 10/2006 | Donnerhacke | A61B 3/112 351/200 |
| 2007/0002571 A1* | 1/2007 | Cejnek | B60Q 1/12 362/460 |
| 2007/0091629 A1* | 4/2007 | Fukawa | B60Q 1/1415 362/509 |
| 2008/0084165 A1* | 4/2008 | Otsuka | H04N 7/183 315/82 |
| 2008/0215202 A1* | 9/2008 | Breed | H04W 4/02 701/25 |
| 2009/0096937 A1* | 4/2009 | Bauer | B60R 1/12 348/739 |
| 2012/0206050 A1* | 8/2012 | Spero | F21S 41/147 315/152 |
| 2012/0243067 A1* | 9/2012 | Baumann | G02F 1/157 359/267 |
| 2012/0253596 A1* | 10/2012 | Ibrahim | G06K 9/00798 701/36 |
| 2013/0049588 A1* | 2/2013 | Foltin | B60Q 1/115 315/82 |
| 2015/0124465 A1* | 5/2015 | Lee | B60Q 1/143 362/465 |
| 2015/0127227 A1* | 5/2015 | Strolz | G06K 9/00818 701/49 |
| 2015/0149045 A1* | 5/2015 | Mizuno | B60Q 1/1423 701/49 |
| 2017/0211247 A1* | 7/2017 | Messiou | F21V 7/04 |
| 2017/0341565 A1* | 11/2017 | Kurashige | B60Q 1/24 |
| 2017/0361759 A1* | 12/2017 | Kim | G01C 21/365 |
| 2018/0348813 A1* | 12/2018 | Tsur | G02B 3/0062 |
| 2018/0372295 A1* | 12/2018 | Kikuchi | F21S 41/255 |
| 2018/0376558 A1* | 12/2018 | Verbakel | H05B 47/175 |
| 2019/0001868 A1* | 1/2019 | Kaino | B60Q 1/1423 |
| 2019/0017681 A1* | 1/2019 | Hoshino | F21S 41/25 |
| 2019/0368688 A1* | 12/2019 | Park | C09D 5/00 |

* cited by examiner

| | REFLECTIVE LUMINANCE | ILLUMINANCE CONDITION WHEN INCIDENT ANGLE IS SMALL (INCIDENT ANGLE 5° OBSERVATION ANGLE 0.2°) | DUTY RATIO |
|---|---|---|---|
| UPPER LIMIT VALUE | 450 cd/m2 | 1.38 lux (SOFT PRISM TYPE) TO 6.43 lux (ENCAPSULATED LENS TYPE) | 3.07% to 14.29% |
| IDEAL VALUE | 200 cd/m2 | 0.62 lux (SOFT PRISM TYPE) TO 2.86 lux (ENCAPSULATED LENS TYPE) | 1.38% to 6.36% |
| LOWER LIMIT VALUE | 35 cd/m2 | 0.11 lux (SOFT PRISM TYPE) TO 0.50 lux (ENCAPSULATED LENS TYPE) | 0.24% to 1.11% |

FIG.4B

| | REFLECTIVE LUMINANCE | ILLUMINANCE CONDITION WHEN INCIDENT ANGLE IS LARGE (INCIDENT ANGLE 30° OBSERVATION ANGLE 1°) | DUTY RATIO |
|---|---|---|---|
| UPPER LIMIT VALUE | 450 cd/m2 | 45.00 lux (SOFT PRISM TYPE) TO 180.00 lux (ENCAPSULATED LENS TYPE) | 100% |
| IDEAL VALUE | 200 cd/m2 | 20.00 lux (SOFT PRISM TYPE) TO 80.00 lux (ENCAPSULATED LENS TYPE) | 44.44% to 100% |
| LOWER LIMIT VALUE | 35 cd/m2 | 3.50 lux (SOFT PRISM TYPE) TO 14.00 lux (ENCAPSULATED LENS TYPE) | 7.78% to 31.11% |

CONTROL APPARATUS FOR VEHICLE HEADLIGHT, CONTROL METHOD FOR VEHICLE HEADLIGHT, VEHICLE HEADLIGHT SYSTEM

BACKGROUND OF THE INVENTION

Field of the Invention

The present invention relates to a lighting control technique for a vehicle headlight that performs selective light irradiation according to the position of a forward vehicle.

Description of the Background Art

Japanese Patent No. 5394901 describes a technique for lowering irradiation luminous intensity of a vehicle headlight to a value that is determined not to cause dazzling to the driver when it is determined that a reflective object such as a road sign is present ahead of an own vehicle and reflected light from the reflective object dazzles the driver of the own vehicle.

In this prior art, a high beam irradiation region is divided into a plurality of regions and the irradiation luminous intensity is controlled for each of the regions (divided regions), and the irradiation luminous intensity is lowered at the divided region corresponding to the position where the reflective object is present.

However, when the above-described control is performed, in the event that a pedestrian is present in the divided region where the luminous intensity is lowered, there is a possibility that visibility of the pedestrian is lowered.

In a specific aspect, it is an object of the present invention to provide a technique which enables to achieve both reduction of a sense of discomfort to the driver due to the reflective object and improvement in visibility of the pedestrian or the like.

SUMMARY OF THE INVENTION

[1] A control apparatus for a vehicle headlight according to one aspect of the present invention is (a) a control apparatus for controlling light irradiated by a headlight of a vehicle, (b) where the control apparatus causes the headlight to form a first irradiation light and a second irradiation light that overlaps a certain range on the lower end side in the vertical direction of the first irradiation light and overlaps the entire range in the width direction of the first irradiation light, and causes to dim at least a part of the entire range of the first irradiation light corresponding to a position of a reflective object when the reflective object fixed on the road ahead of the vehicle is present.

[2] A control apparatus for a vehicle headlight according to one aspect of the present invention is (a) a control apparatus for controlling light irradiated by a headlight of a vehicle including: (b) an irradiation instruction unit that instructs the headlight to form a first irradiation light and a second irradiation light that overlaps a certain range on the lower end side in the vertical direction of the first irradiation light and overlaps the entire range in the width direction of the first irradiation light; (c) a dimming instruction unit that instructs to dim at least apart of the entire range of the first irradiation light corresponding to a position of a reflective object when the reflective object fixed on the road ahead of the vehicle is present; and (d) a lighting control unit that controls lighting of the headlight according to each instruction from the irradiation instruction unit and the dimming instruction unit.

[3] A control method for a vehicle headlight according to one aspect of the present invention is (a) a control method for controlling light irradiated by a headlight of a vehicle, (b) where the control method causes the headlight to form a first irradiation light and a second irradiation light that overlaps a certain range on the lower end side in the vertical direction of the first irradiation light and overlaps the entire range in the width direction of the first irradiation light, and causes to dim at least apart of the entire range of the first irradiation light corresponding to the position of a reflective object when the reflective object fixed on the road ahead of the vehicle is present.

[4] A vehicle headlight system according to one aspect of the present invention includes a control apparatus described above and a vehicle headlight controlled by the control apparatus.

According to each of the above configurations, reduction of a sense of discomfort to the driver due to the reflective object and improvement in visibility of the pedestrian or the like can both be achieved.

DESCRIPTION OF THE PREFERRED EMBODIMENTS

Figure 1:
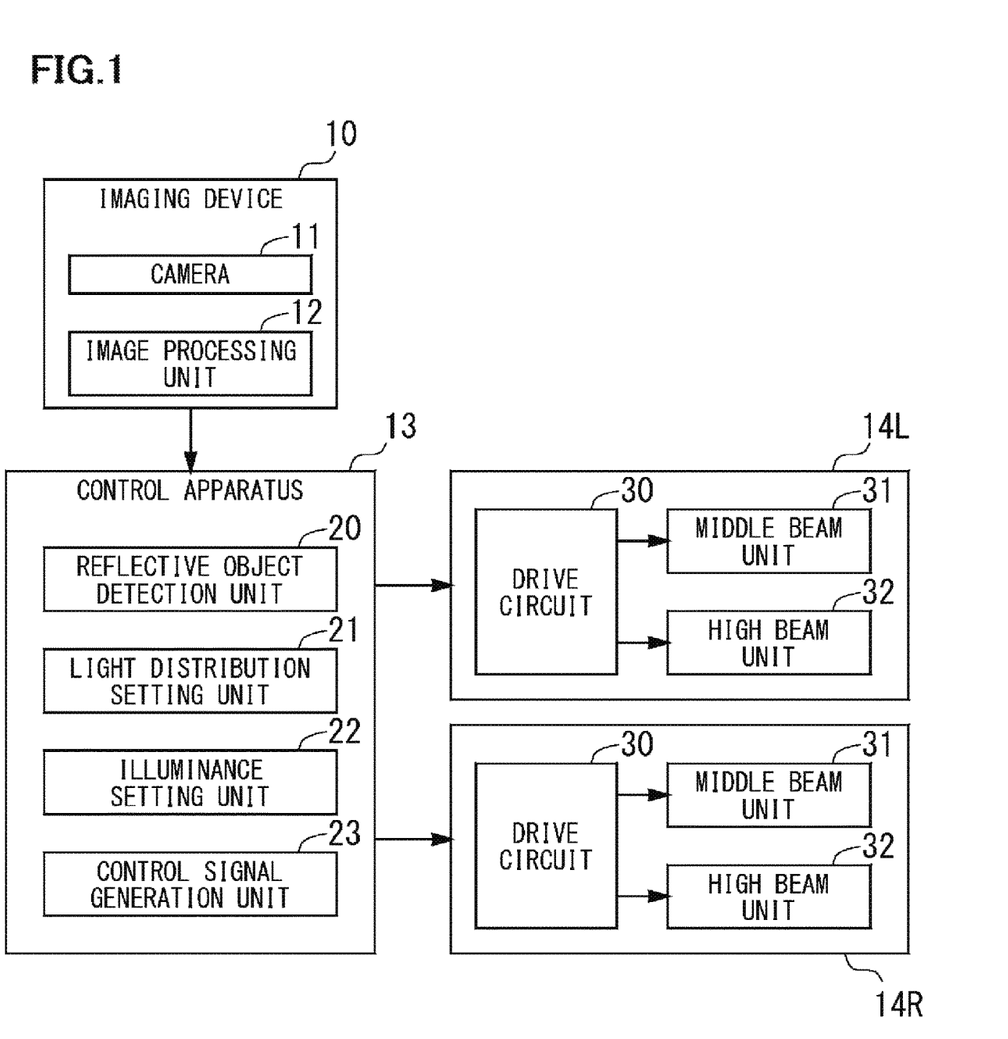
FIG. 1 is a block diagram illustrating a configuration of a vehicle headlight system according to one embodiment.

FIG. 1 is a block diagram illustrating a configuration of a vehicle headlight system according to one embodiment. The illustrated vehicle headlight system is configured to include an imaging device 10, a control apparatus (lighting control apparatus) 13, and a pair of lamp units (vehicle headlights) 14L, 14R.

The imaging device 10 includes a camera 11 and an image processing unit 12. The camera 11 is installed at a predetermined position of the own vehicle (for example, upper part of a windshield in the own vehicle cabin) and captures an image of a space ahead of the own vehicle. The image processing unit 12 performs a predetermined image processing on an image (video) captured by the camera 11 to detect a target object which exists ahead of the own vehicle. Here, the "target object" corresponds to, for example, a road sign, a preceding vehicle, a pedestrian, a cyclist, an obstacle, a road marking such as a white line, etc. on the road surface, or the like.

Here, if a device equivalent to the imaging device 10 is installed in the own vehicle for other purposes (for example, a steering assistance function, an automatic braking function, or the like), the imaging device 10 may be omitted by using the output of the device.

The control apparatus 13 is realized by using a computer system having, for example, a CPU, a ROM, a RAM, and the like, and executing a predetermined operation program in the computer system. The control apparatus 13 includes a reflective object detection unit 20, a light distribution setting unit 21, an illuminance setting unit 22, and a control signal generation unit 23 as functional blocks. Here, the light distribution setting unit 21 corresponds to an "irradiation instruction unit", the reflective object detection unit 20 and the illuminance setting unit 22 correspond to a "dimming instruction unit", and the control signal generation unit 23 corresponds to a "lighting control unit".

When a reflective object is present, the reflective object detection unit 20 acquires information such as its position, size, shape, and reflective luminance, based on the result of the image processing output from the image processing unit 12 of the imaging device 10. As the reflective object in the present embodiment, a road sign fixed to a road is mainly assumed.

The light distribution setting unit 21 variably sets a light distribution pattern according to the position of the reflective object detected by the imaging device 10 and instructs the control signal generation unit 23 to form irradiation light based on the light distribution pattern. The light distribution pattern includes a light irradiation range and a dimming range. For example, a partial range corresponding to the position where the reflective object exists is set as the dimming range, and the range corresponding to the position where the reflective object does not exist is set as the light irradiation range. In the present embodiment, with regard to middle beam (second irradiation light) which will be described in detail later, basically, its entire irradiation range is set as the light irradiation range, and with regard to high beam (first irradiation light), the light irradiation range and the dimming range are set according to the position of the reflective object.

The illuminance setting unit 22 sets the illuminance of each of the lamp units 14L, 14R when light on/off control is performed and instructs the control signal generation unit 23 to form irradiation light with the set illuminance. In the present embodiment, in particular, the illuminance of light caused by the high beam unit 32 is variably set, which will be described later.

The control signal generation unit 23 generates a light distribution control signal which is a control signal for turning on and off each of the lamp units 14L, 14R according to the light distribution pattern set by the light distribution setting unit 21 and the illuminance set by the illuminance setting unit 22, and outputs the signal to each of the lamp units 14L, 14R.

Each of the lamp units 14R, 14L is provided one by one on the left and right sides of the front part of the vehicle, and the lamp units are intended to irradiate light forward of the vehicle. Each of the lamp units 14R, 14L has a drive circuit 30, a middle beam unit 31, and a high beam unit 32.

The drive circuit 30 drives the middle beam unit 31 and the high beam unit 32 based on the control signal provided from the control signal generation unit 23 of the control apparatus 13. For example, in the present embodiment, each light emitting element of the middle beam unit 31 and the high beam unit 32 is driven by a pulse width modulation (PWM control), and the illuminance of light of each unit is controlled by increasing or decreasing its duty ratio.

The middle beam unit 31 is configured to include a plurality of light emitting elements (LEDs) arranged in a matrix for example, and a lens that condenses and projects light emitted from the light emitting elements, and forms a middle beam (see FIG. 2 to be described later) by receiving driving power from the drive circuit 30. The lighting of each light emitting element of the middle beam unit 31 can be individually controlled.

The high beam unit 32 is configured to include a plurality of light emitting elements (LEDs) arranged in a matrix for example, and a lens that condenses and projects light emitted from the light emitting elements, and forms a high beam (see FIG. 2 to be described later) by receiving driving power from the drive circuit 30. The lighting of each light emitting element of the high beam unit 32 can be controlled individually.

FIGS. 2A to 2D are diagrams for explaining the middle beam formed by the middle beam unit and the high beam formed by the high beam unit. These FIGS. 2A to 2D schematically illustrate the shape and arrangement of each beam on a virtual screen at a predetermined position in front of the own vehicle (for example, a position 25 meters ahead). Although not shown here, the conventional low beam used as a passing-by light is also properly formed at a position relatively lower than the middle beam and the high beam (see FIG. 7 to be described later).

Figure 2A:
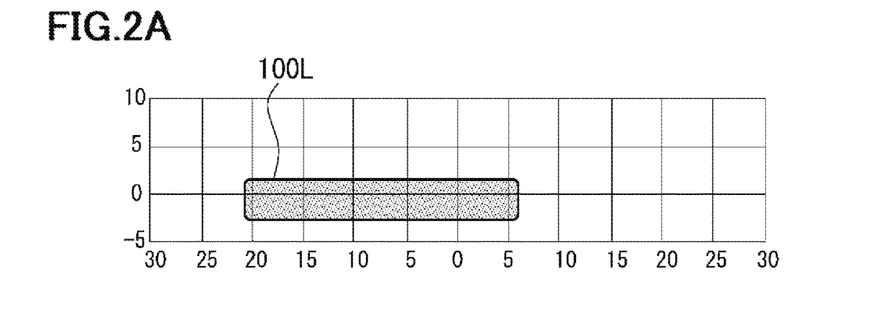
FIGS. 2A to 2D are diagrams for explaining the middle beam formed by the middle beam unit and the high beam formed by the high beam unit.

FIG. 2A shows a middle beam formed by the middle beam unit 31 of the lamp unit 14L. The middle beam 100L is formed at a range deviated to the left with respect to the front of the vehicle (horizontal axis 0°), and is formed at a range below a position slightly above (around 1°) a horizontal line (vertical axis 0°).

Figure 2B:
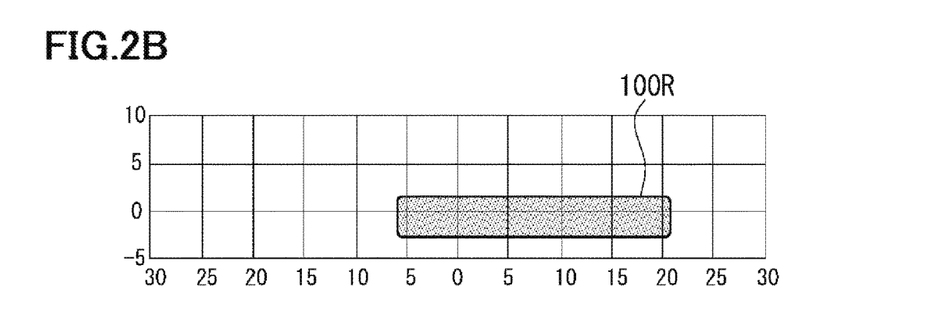

Similarly, FIG. 2B shows a middle beam formed by the middle beam unit 31 of the lamp unit 14R. The middle beam 100R is formed at a range deviated to the right with respect to the front of the vehicle (horizontal axis 0°), and is formed at a range below a position slightly above (around 1°) a horizontal line (vertical axis 0°).

Figure 2C:
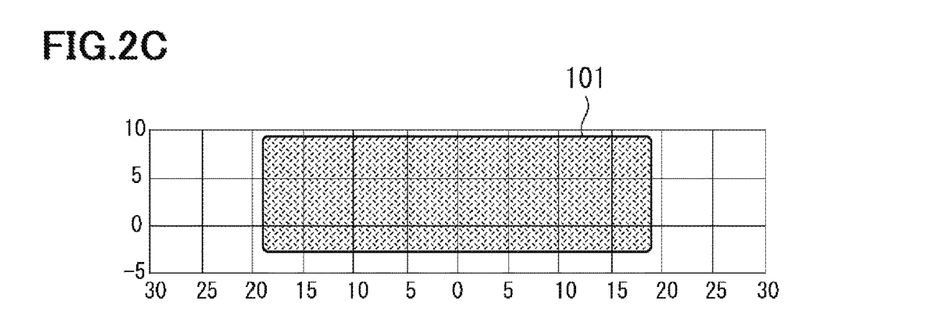
Figure 2D:
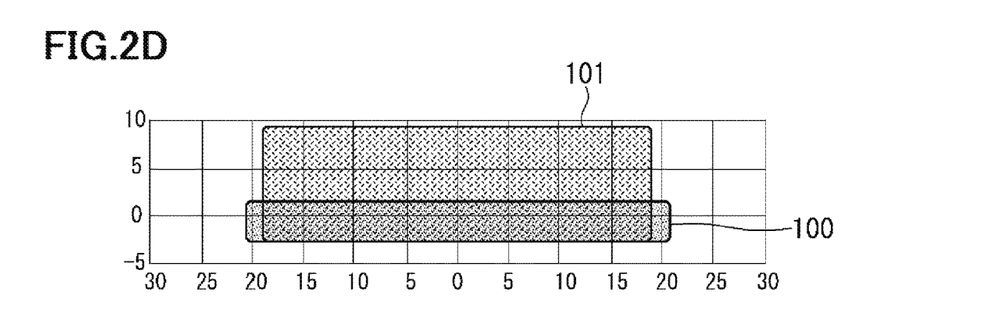

By combining these middle beams 100L and 100R, one middle beam 100 is formed as shown in FIG. 2D. In the left-right direction (horizontal direction) in the figure, each of a plurality of regions of the middle beam 100 can be turned on and off individually.

FIG. 2C shows a high beam formed by each high beam unit 32 of the lamp units 14L, 14R. The high beam 101 is formed equally in left and right with respect to the front of the vehicle (horizontal axis 0°), and is formed ranging from a position slightly below (a position around −2°) the horizontal line (vertical axis 0°) to a position higher than the horizontal line (a position 5° to 6° above the vertical axis). The high beam 101 is formed by superimposing light from each high beam unit 32. In the left-right direction (horizontal direction) in the figure, each of a plurality of regions of the high beam 101 can be turned on and off individually.

As shown in FIG. 2D, the high beam 101 partially overlaps the middle beam 100. In the present embodiment, the lower end of the middle beam 100 and that of the high beam 101 are substantially at the same position, and the upper end of the high beam 101 is set at a relatively higher position. The high beam 101 irradiates the same range as a conventional high beam used as a traveling light, and is intended to illuminate a position farther from the own vehicle. On the other hand, the middle beam 100 is formed at a position lower than the conventional high beam and higher than the conventional low beam used as the passing-by light. The middle beam 100 is formed at an intermediate height between the conventional high beam and low beam, and is formed wider than the high beam 101. That is, the middle beam 100 is formed so as to overlap a certain range from the lower end side of the high beam 101 in the vertical direction, and overlap the high beam 101 in the entire horizontal direction. The middle beam 101 is suitable for making it easier to visually recognize a pedestrian, a cyclist, an obstacle, or the like existing on the side of a road, a roadside zone, or the like.

Further, in the present embodiment, the brightness of the middle beam 100 and the high beam 101 are set to be different. Specifically, when comparing the middle beam 100 and the high beam 101, the high beam 101 is relatively brighter than the middle beam 100. Here, the difference in brightness may be a difference in luminance of light emitted from each of the middle beam unit 31 and the high beam unit 32 (for example, the luminance at the emitting surface of the light emitting element), or may be a difference in illuminance of the middle beam 100 and the high beam 101 that are actually irradiated on the road surface (or on the virtual screen) by the emitted light. Further, the difference in brightness may be a difference between the brightest portion of the middle beam 100 and the high beam 101, or may be a difference between the average of entire irradiation range of each of the middle beam 100 and the high beam 101.

Figure 3:
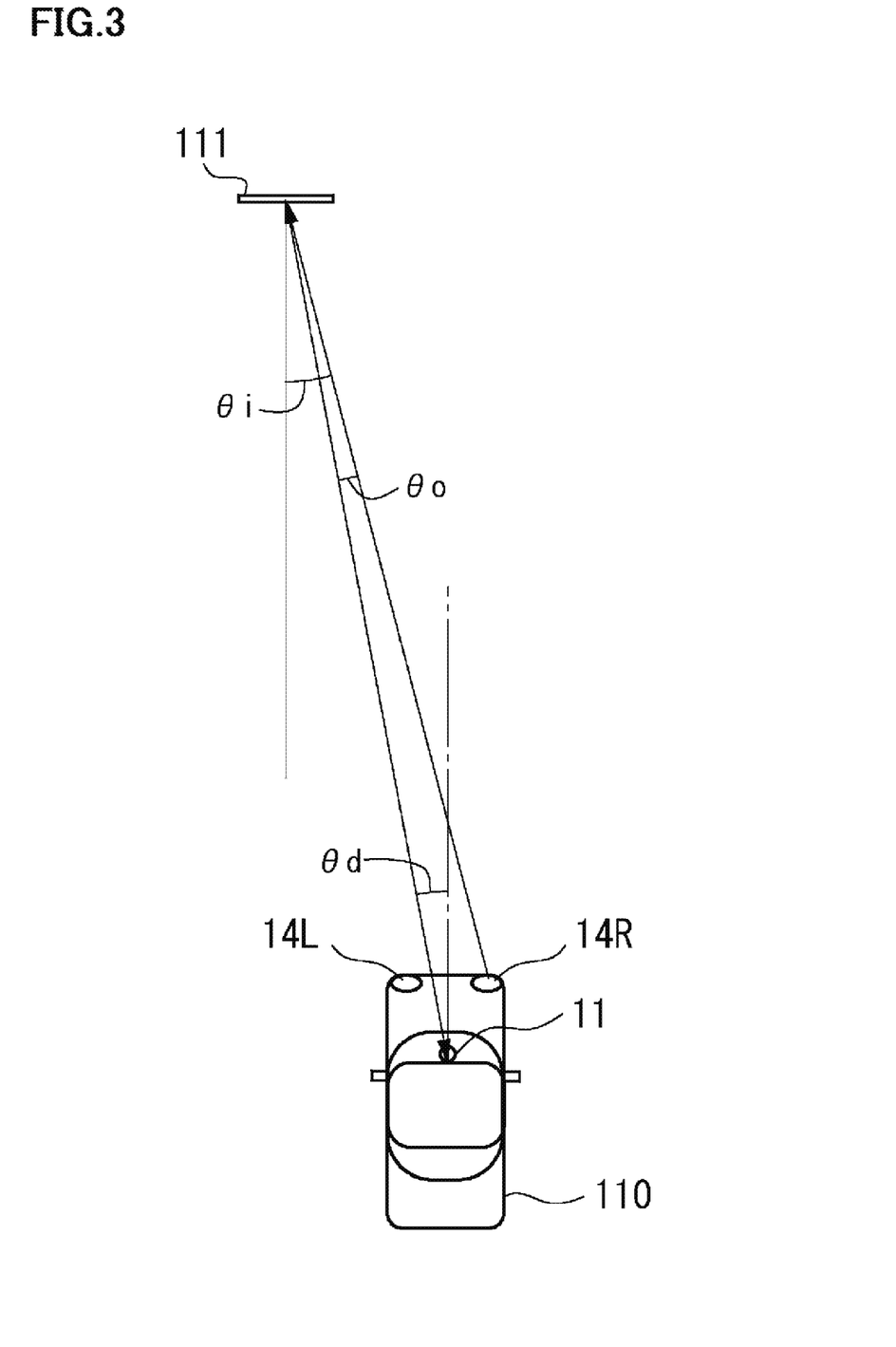
FIG. 3 is a diagram for explaining the positional relationship between the own vehicle and the reflective object.

FIG. 3 is a diagram for explaining the positional relationship between the own vehicle and the reflective object. Consider a situation in which the reflective object 111 is present in front of the own vehicle 110 (in the illustrated example, to the left front), light enters the reflective object 111 from the lamp units 14R, 14L of the own vehicle 110, and the reflected light is photographed by the camera 11 installed in the own vehicle 110. Further, the reflective object 111 such as a road sign is considered to have a retroreflective material on at least part of the surface. The illustrated example shows a case where light from the lamp unit 14R enters, but the same applies to the lamp unit 14L. As shown in the figure, the angle between the light beam emitted from the lamp unit 14R and the normal line to the surface of the reflective object 111 is defined as an incident angle θi. Further, the angle between the light beam emitted from the lamp unit 14R and the light beam when light is reflected by the reflective object 111 and enters the camera 11 is defined as an observation angle θo. Further, the position of the reflective object 111 detected by the camera 11 shall be represented by a detection angle θd, which is an angle defined by setting the longitudinal axis of the own vehicle 110 to 0°. Here, the relation of θo=θi−θd is satisfied. Further, the angle at which the driver of the own vehicle 110 views the reflected light from the reflective object 111 is deemed to be equal to the observation angle θo. Here, since the light reflected from the reflective object 111 is a retroreflected light, in theory, the observation angle θo becomes an extremely small value.

When a retroreflective material is used for the reflective object 111, its reflective performance (luminance of the reflected light) differs depending on the incident angle θi and the observation angle θo. Thus, in the present embodiment, by variably setting illuminance of light from the lamp unit 14R (14L) in accordance with the incident angle θi, the reflective luminance caused by the reflective object 111 is properly increased or decreased, thereby reducing the discomfort to the driver, etc. In general, the range of reflective luminance within which a driver can easily read a road sign and does not feel glare is said to be 35 cd/m² to 450 cd/m², and the most preferable condition is said to be 200 cd/m². (Source: The 1996 Road Technology Five-Year Plan, Japan's Ministry of Land, Infrastructure, Transport and Tourism.) Based on this knowledge, it is desirable that the reflective luminance by the reflective object 111 be within the range of 35 cd/m² to 450 cd/m² according to the incident angle θi, and more preferably, as close as possible to the most desirable condition of 200 cd/m².

Figure 4A:
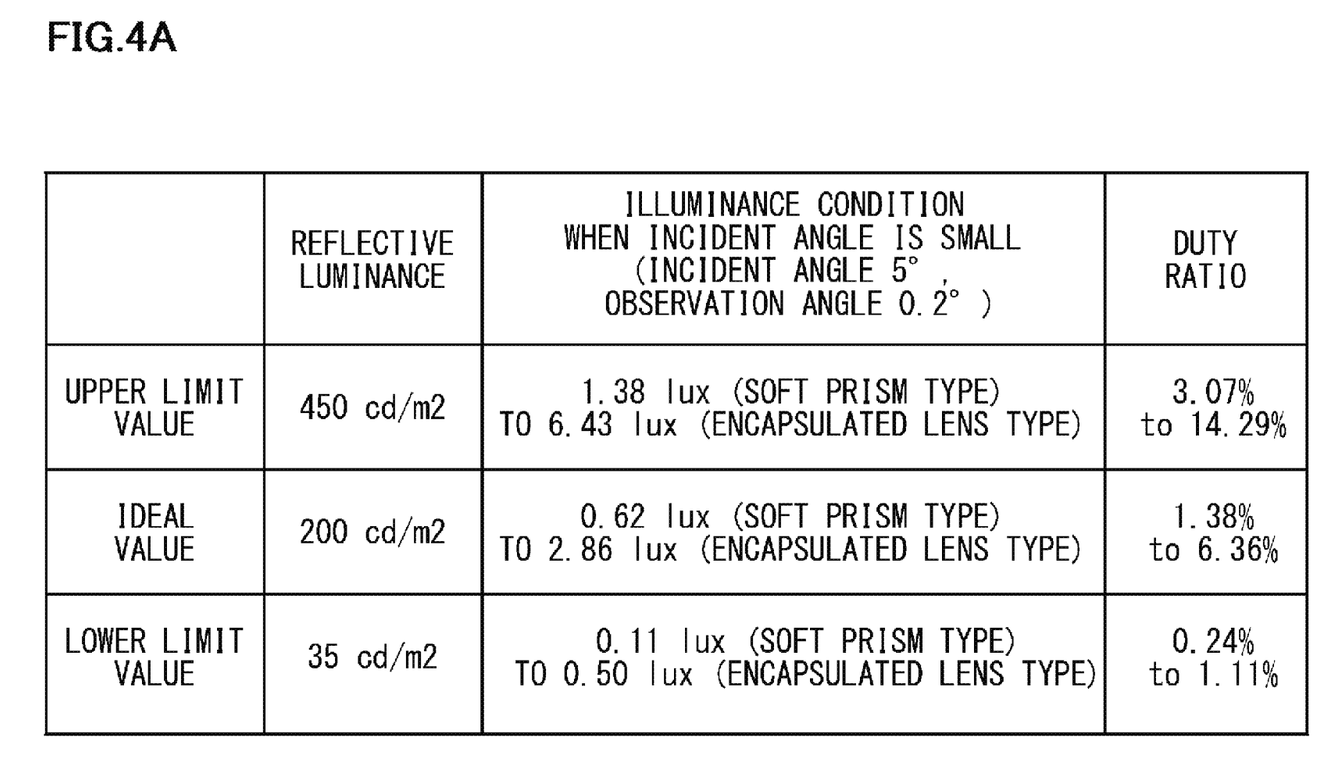
FIGS. 4A and 4B are diagrams for explaining control of reflective luminance caused by the reflective object.
Figure 4B:
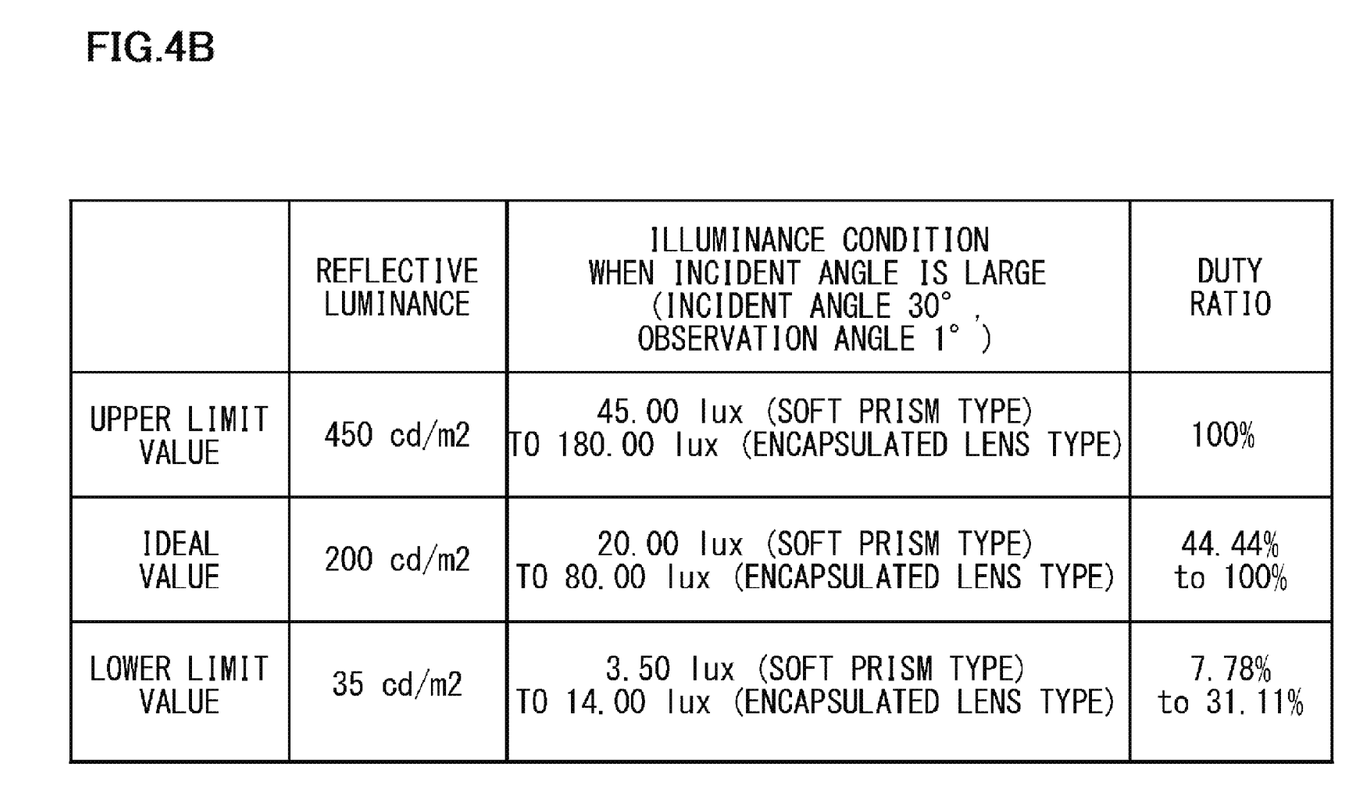

FIGS. 4A and 4B are diagrams for explaining control of reflective luminance caused by the reflective object. Generally, there are different types of retroreflective materials such as an encapsulated lens type, a capsule lens type, and a soft prism type, each having a different reflective performance. Therefore, the illuminance condition is provided with a range. As an example, it is assumed here that the lamp unit 14R (particularly, the high beam unit 32) is PWM-controlled as described above, and that the illuminance when the lamp unit 14R is lit at a duty ratio of 100% is 45 lux. As shown in FIGS. 4A and 4B, for example, in order to achieve an upper limit value of the reflective luminance which is 450 cd/m², under the condition in which the incident angle is relatively small (incident angle 5°, observation angle 0.2°), an illuminance of 1.38 lux to 6.43 lux is required, and duty ratio for achieving it becomes 3.07% to 14.29%. On the other hand, under the condition in which the incident angle is relatively large (incident angle 30°, observation angle 1°), an illuminance of 45.00 lux to 180.00 lux is required, and the duty ratio for achieving it becomes 100%. Note that the duty ratio here corresponds to "the degree of dimming" (the same shall apply hereinafter).

Similarly, in order to achieve an ideal value of the reflective luminance which is 200 cd/m², under the condition in which the incident angle is relatively small (incident angle 5°, observation angle 0.2°), an illuminance of 0.62 lux to 2.86 lux is required, and duty ratio for achieving it becomes 1.38% to 6.36%. On the other hand, under the condition in which the incident angle is relatively large (incident angle 30°, observation angle 1°), 20.00 lux to 80.00 lux lux is required, and duty ratio for achieving it becomes 44.44% to 100%.

Similarly, in order to achieve a lower limit value of the reflective luminance which is 35 cd/m², under the condition in which the incident angle is relatively small (incident angle 5°, observation angle 0.2°), an illuminance of 0.11 lux to 0.50 lux is required, and duty ratio for achieving it becomes 0.24% to 1.11%. On the other hand, under the condition in which the incident angle is relatively large (incident angle 30°, observation angle 1°), 3.50 lux to 14.00 lux is required, and the duty ratio for achieving it become 7.78% to 31.11%.

Here, FIGS. 4A and 4B merely show one example, and in reality, the relationship between the incident angle and duty ratio is stored in a memory (not shown in the figures) in a form of a data table for example, and the illuminance setting unit 22 sets a duty ratio for achieving illuminance according to the incident angle with reference to this data table. Although the reflective luminance may be arbitrarily set, it is preferably set to the ideal value. Further, for one incident angle, the duty ratio has a range, therefore a median value is set, for example. This is because it is difficult to identify which type of retroreflective material is used for the reflective object 111.

Figure 5:
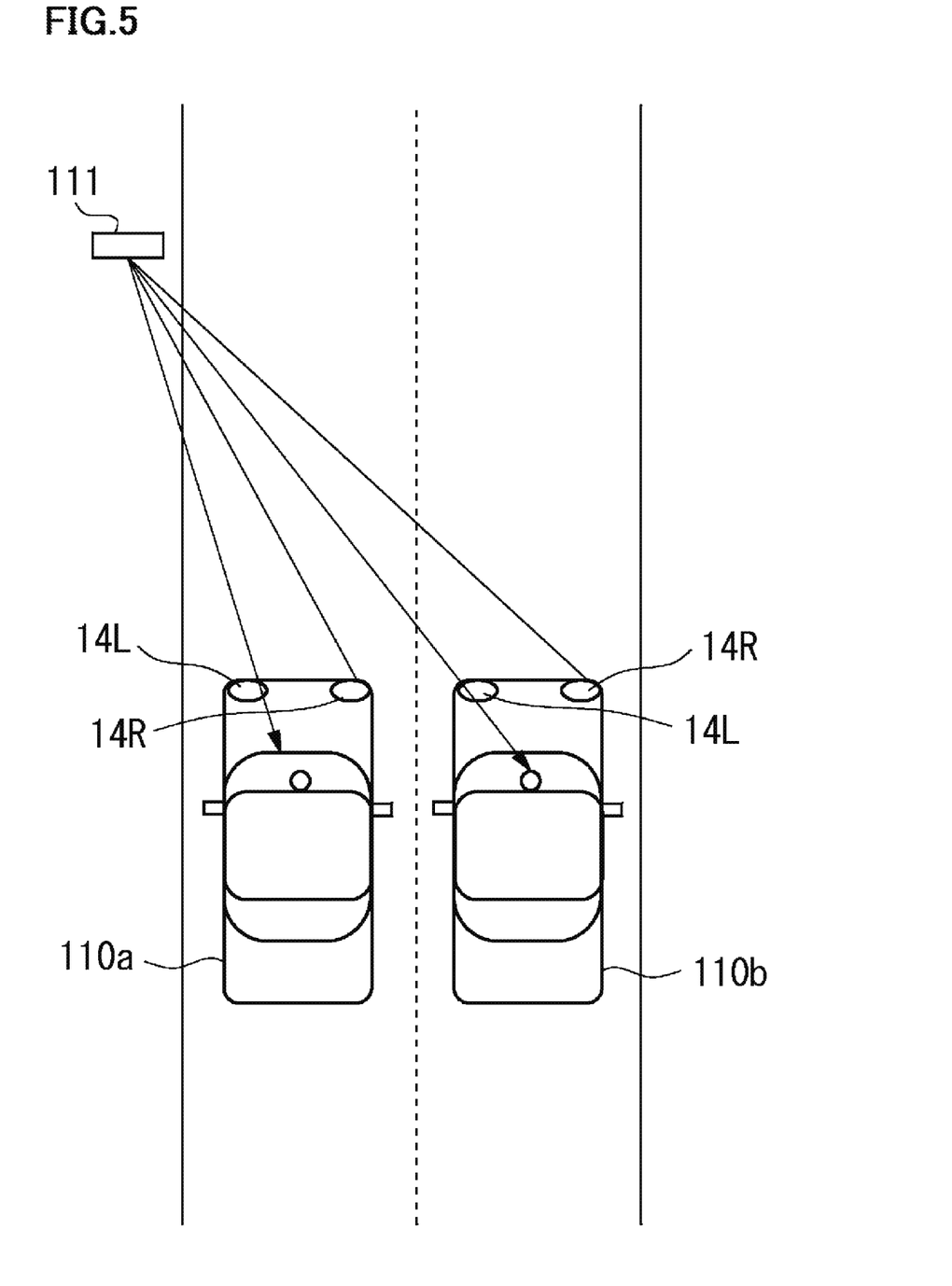
FIG. 5 is a diagram for explaining the benefit of setting the illuminance according to the incident angle.

FIG. 5 is a diagram for explaining the benefit of setting the illuminance according to the incident angle. The incident angle with respect to a certain reflective object 111 differs depending on the relative position of the own vehicle. In the illustrated example, the vehicle 110a existing on the left lane which is close to the reflective object 111 and the vehicle 110b existing on the right lane have different incident angles. Therefore, if illuminance of light from the lamp unit 14R (14L) is set under the same condition, there may be a case where an appropriate reflective luminance is not obtained. On the contrary, by controlling the illuminance according to the incident angle as in the present embodiment, it is possible to set the reflective luminance more appropriately.

Figure 6:
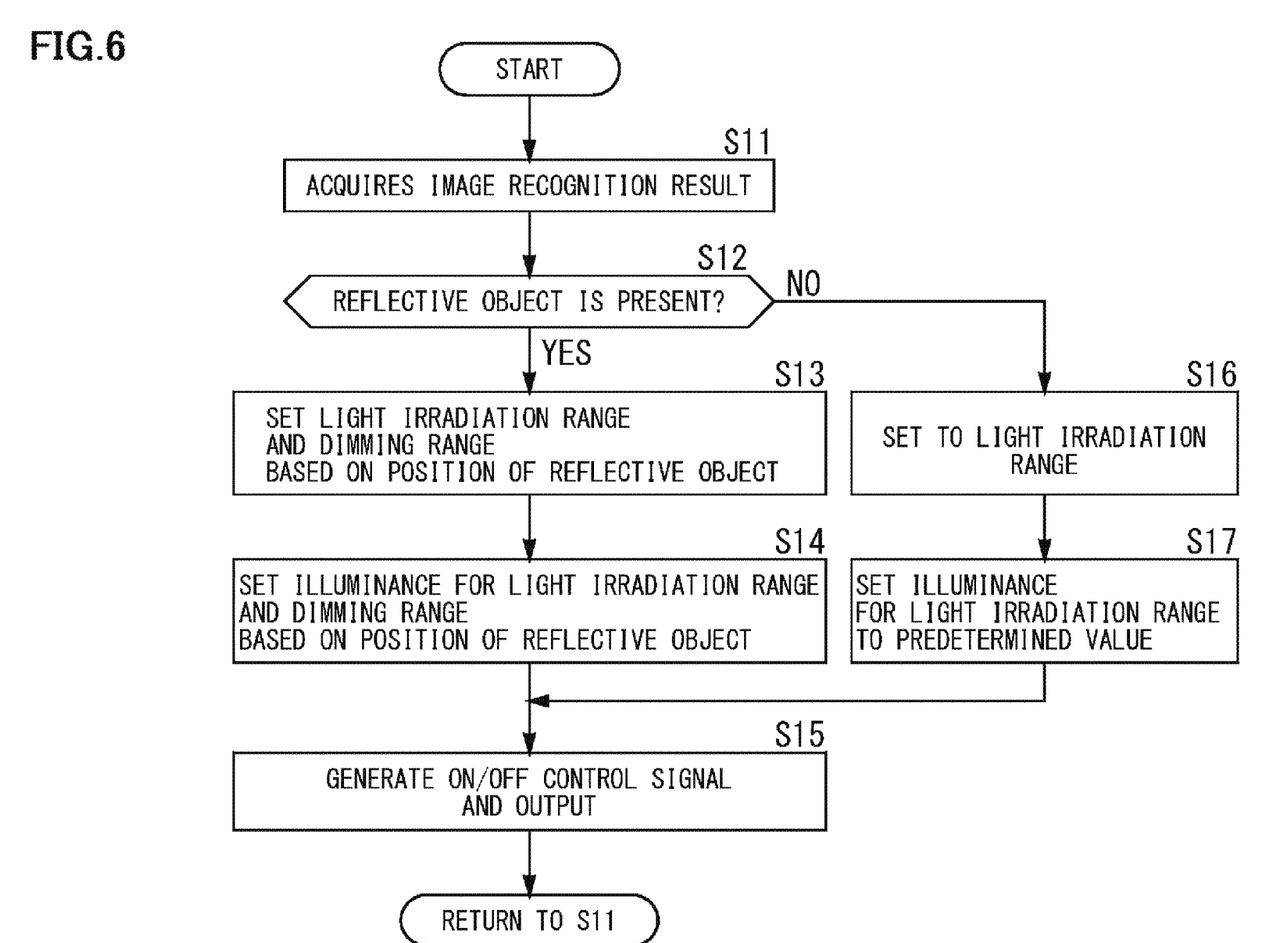
FIG. 6 is a flowchart showing a processing procedure of lighting control in the control apparatus.

FIG. 6 is a flowchart showing a processing procedure of lighting control in the control apparatus. Hereinafter, a processing procedure after each of the middle beam unit 31 and the high beam unit 32 of each of the lamp units 14L, 14R is turned on by a lighting operation of a light switch of the own vehicle will be described in detail with reference to the flowchart. Note that the processes shown in the flowchart can be executed in a different order as long as no inconsistency or mismatching occurs in the result, and such a mode is not excluded.

The reflective object detection unit 20 acquires an image recognition result outputted from the image processing unit 12 of the imaging device 10 (step S11), and determines whether or not a reflective object is present based on the result (step S12).

When a reflective object is present (step S12; YES), the light distribution setting unit 21 sets alight irradiation range and a dimming range which is a light distribution pattern in accordance with the position of the reflective object (step S13). Here, of the entire range of the high beam 101, a partial range corresponding to the position of the reflective object is set as the dimming range, and the other range is set as the light irradiation range. With regard to the middle beam 100, its entire range is set as the light irradiation range.

In addition, the illuminance setting unit 22 sets the illuminance for the dimming range of the high beam 101 according to the relative position of the reflective object 111, and also sets the illuminance to a predetermined value for the other light irradiation range (step S14). Here, since the position of the reflective object detected by the imaging device 10 is obtained by the above-described detection angle θd, in this embodiment, the illuminance is set by regarding the detection angle θd as the incident angle θi. As shown in FIG. 3, since the detection angle θd becomes an intermediate value of each of the incident angles θi of the left and right lamp units 14R, 14L, it is preferable.

Next, the control signal generation unit 23 generates a control signal (light distribution control signal) to turn on and off each of the lamp units 14L, 14R according to the light distribution pattern set by the light distribution setting unit 21 and the illuminance set by the illuminance setting unit 22, and outputs the control signal to each of the lamp units 14L, 14R (step S15). As a result, with regard to the high beam 101, the dimming range becomes a relatively low illuminance which is set according to the position of the reflective object 111 and the light irradiation range becomes a predetermined illuminance, and each range is irradiate with light. Further, with regard to the middle beam 101, its entire range becomes a predetermined illuminance, and is irradiated with light.

On the other hand, when no reflective object is present (step S12; NO), the light distribution setting unit 21 sets the entire range of the high beam 101 to the light irradiation range and also sets the entire range of the middle beam 100 to the light irradiation range (step S16). Further, the illuminance setting unit 22 sets the illuminance of the high beam 101 and the middle beam 100 to a predetermined value corresponding to a case where no reflective object is present (step S17).

In this case, the control signal generation unit 23 generates a control signal (light distribution control signal) to turn on and off each of the lamp units 14L, 14R according to the light distribution pattern set by the light distribution setting unit 21 and the illuminance set by the illuminance setting unit 22, and outputs the control signal to each of the lamp units 14L, 14R (step S15). Thereby, the entire range of the high beam 101 and the middle beam 101 becomes a predetermined illuminance, and is irradiated with light.

Figure 7:
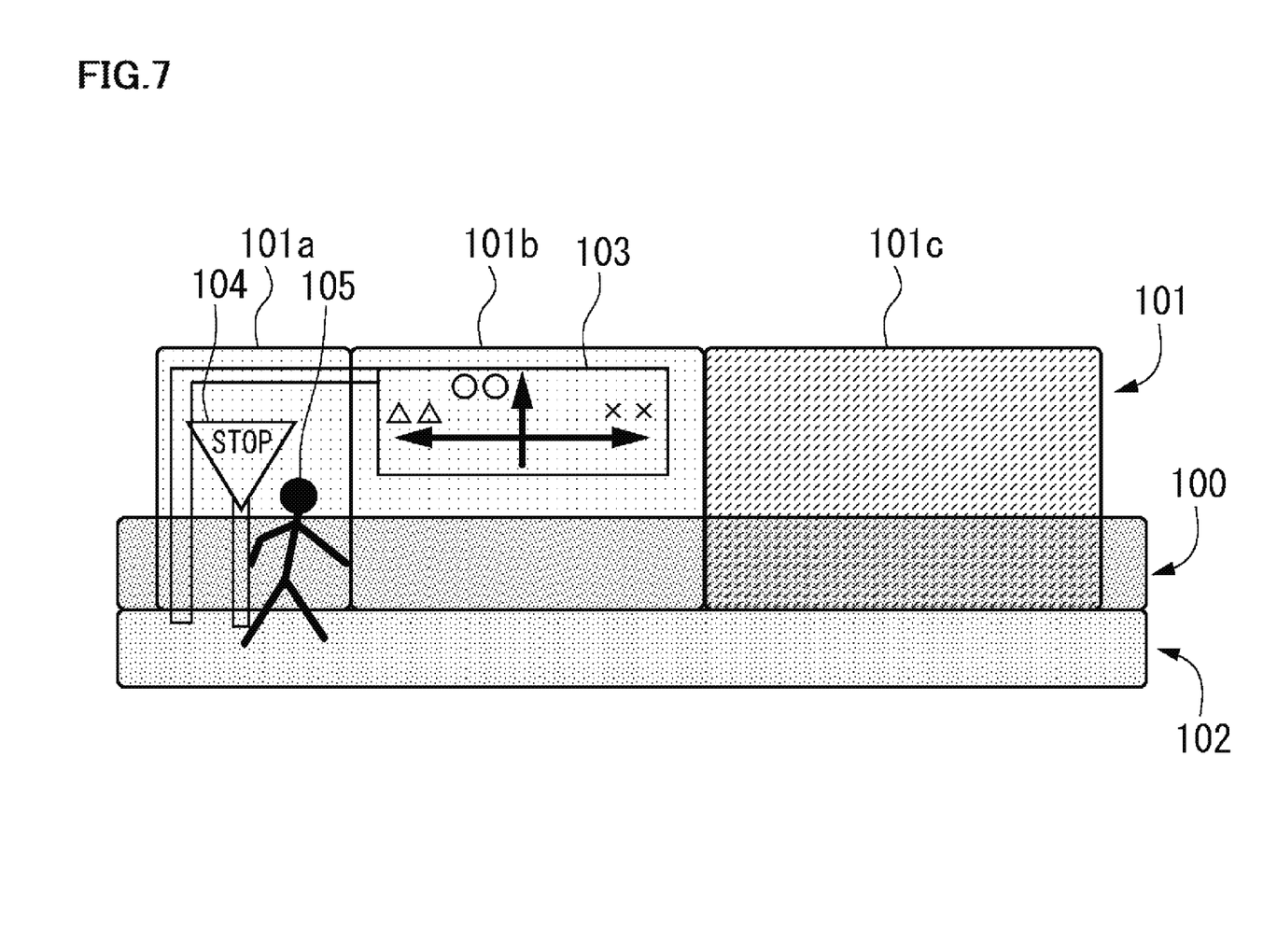
FIG. 7 is a schematic diagram for explaining a state of lighting control by the vehicle headlight system.

FIG. 7 is a schematic diagram for explaining a state of lighting control by the vehicle headlight system. In the example shown in the figure, of the entire range of high beam 101, illuminance of dimming ranges 101a and 101b are set corresponding to the positions where reflective objects 103, 104 (which are road signs) are present. The illuminance of the dimming ranges 101a and 101b are set to be relatively low with a value corresponding to the position of each of the reflective objects 103, 104. Further, illuminance of light irradiation range 101c is set to a relatively high predetermined value. Thereby, glare to the driver due to the reflective objects 103, 104 is reduced. In particular, in the present embodiment, the illuminance of each of the dimming ranges 101a and 101b is set according to the position of each of the reflective objects 103, 104, or in other words, according to the relative angle with reference to the own vehicle. Thereby, suitable illuminance according to the positional relationship between the own vehicle and each of the reflective objects 103, 104 is realized, and the effect of reducing glare is enhanced.

Further, with regard to middle beam 100, illuminance of the entire irradiation range is set to a predetermined value. Thus, as shown in the figure for example, even when a pedestrian 105 is present in the dimming range 101a, the middle beam 100 maintains light irradiation with relatively high illuminance to the pedestrian 105. Thereby, the visibility of the pedestrian 105 is improved.

Further, in FIG. 7, a low beam 102 irradiated by another lamp unit (not shown in FIG. 1) is also shown at a position relatively lower than the middle beam 100 and the high beam 101. Here, the low beam 102 is a passing-by light whose lower end of irradiation range is set to be lower than those of the middle beam 100 and the high beam 101, so that a relatively short distance in front of the vehicle is irradiated. As shown in the figure, although the low beam 102 does not sufficiently emit light to the pedestrian 105, in the present embodiment, the visibility of the pedestrian 105 is improved by the irradiation of the middle beam 100.

According to the embodiment as described above, reduction of a sense of discomfort to the driver due to the reflective object and improvement in visibility of the pedestrian or the like can both be achieved.

It should be noted that this invention is not limited to the subject matter of the foregoing embodiments, and can be implemented by being variously modified within the scope of the present invention as defined by the appended claims. For example, in the embodiment as described above, the position of the reflective object is determined by an angle, but the method for determining the position is not limited thereto, and the position may be determined by coordinate values on a two-dimensional coordinate.

In the above-described embodiment, a high beam unit having a plurality of light emitting elements was cited as a configuration example for performing selective light irradiation for each portion of the high beam, but the present invention is not limited thereto. For example, a combination of a light source and a light modulation apparatus (a liquid crystal apparatus, etc.) having a plurality of shutter elements capable of transmitting and shielding light from a light source for each portion may be used, or an apparatus that forms a shadow image by scanning with a mirror device or the like while properly driving on or off laser light emitted from a light source may be used.

In the above-described embodiment, entire range of high beam is divided into a plurality of sections along the vehicle width direction (horizontal direction), and light illuminance is controlled in each of the divided sections. However, the entire range may be divided into a matrix along the vehicle width direction and the vehicle height direction (vertical direction) to control light illuminance in each divided section. Contrary to the above, when a reflective object is present, lighting control may be performed so that illuminance of the entire range of high beam is reduced in accordance with the position of the reflective object. In this case, control is simplified and configuration of the high beam unit can also be simplified.

What is claimed is:

1. A controller for controlling light irradiated by a headlight of a vehicle,
    wherein the controller is configured to cause the headlight to form a first irradiation light, a second irradiation light, and a third irradiation light, and
    the controller is further configured to cause the second irradiation light to overlap a certain range on the lower end side in the vertical direction of the first irradiation light, and to overlap the entire range in the width direction of the first irradiation light,
    the controller is further configured to cause the second irradiation light to be formed within a range that overlaps a horizontal line in the vertical direction and at least a range that overlaps a lower end of the first irradiation light,
    the controller is further configured to cause the third irradiation light to be formed so that its lower end is located at a position relatively lower than the lower end of the first irradiation light and a lower end of the second irradiation light, and
    the controller is further configured to dim at least a part of the entire range of the first irradiation light corresponding to a position of a reflective object when the reflective object fixed on the road ahead of the vehicle is present and to maintain the irradiation of each of the second irradiation light and the third irradiation light.

2. The controller for the headlight of the vehicle according to claim 1,
    wherein the controller is configured to dim the entire range of the first irradiation light when a reflective object is present.

3. The controller for the headlight of the vehicle according to claim 1,
    wherein a degree of dimming the first irradiation light is variably set according to the relative position of the reflective object with respect to the vehicle.

4. The controller for the headlight of the vehicle according to claim 3,
    wherein the reflective object has a retroreflective material on at least a part of its surface, and the degree of dimming is set according to the reflective luminance assumed by the retroreflective material.

5. The controller for the headlight of the vehicle according to claim 1,
    wherein the reflective object is a road sign.

6. The controller for the headlight of the vehicle according to claim 1,
    wherein the controller is configured to dim the first irradiation light so that luminance of reflected light generated from the reflective object by the first irradiation light is in a range of 35 cd/m2 to 450 cd/m2.

7. A control method for controlling light irradiated by a headlight of a vehicle,
    wherein the control method includes causing the headlight to form a first irradiation light, a second irradiation light, and a third irradiation light,
    causing the second irradiation light to overlap a certain range on the lower end side in the vertical direction of the first irradiation light and to overlap the entire range in the width direction of the first irradiation light,
    causing the second irradiation light to be formed within a range that overlaps a horizontal line in the vertical direction and at least a range that overlaps a lower end of the first irradiation light,
    causing the third irradiation light to be formed so that its lower end is located at a position relatively lower than the lower end of the first irradiation light and a lower end of the second irradiation light, and wherein the control method further includes
    causing to dim at least a part of the entire range of the first irradiation light corresponding to the position of a reflective object when the reflective object fixed on the road ahead of the vehicle is present, and maintaining the irradiation of each of the second irradiation light and the third irradiation light.

8. The control method for the headlight of the vehicle according to claim 7,
    wherein the control method causes to dim the entire range of the first irradiation light when a reflective object is present.

9. A vehicle headlight system comprising the controller according to claim 1 and a vehicle headlight controlled by the controller.

10. The controller for the headlight of the vehicle according to claim 1,
    wherein the reflective object has a retroreflective material on at least part of its surface, and
    wherein the controller variably sets a degree of dimming the first irradiation light based on the assumed reflective luminance of the retroreflective material corresponding to a detection angle of the reflective object based on the position of the vehicle.

11. The control method for the headlight of the vehicle according to claim 7,
    wherein the reflective object has a retroreflective material on at least part of its surface, and
    wherein the control method includes variably setting a degree of dimming the first irradiation light based on the assumed reflective luminance of the retroreflective material corresponding to a detection angle of the reflective object based on the position of the vehicle.

* * * * *